Oct. 17, 1939.  C. JOBST  2,176,672
BRUSH MAKING MACHINE
Filed Dec. 21, 1936   7 Sheets-Sheet 1

INVENTOR
CONRAD JOBST
BY Whittemore Hulbert & Belknap
ATTORNEYS

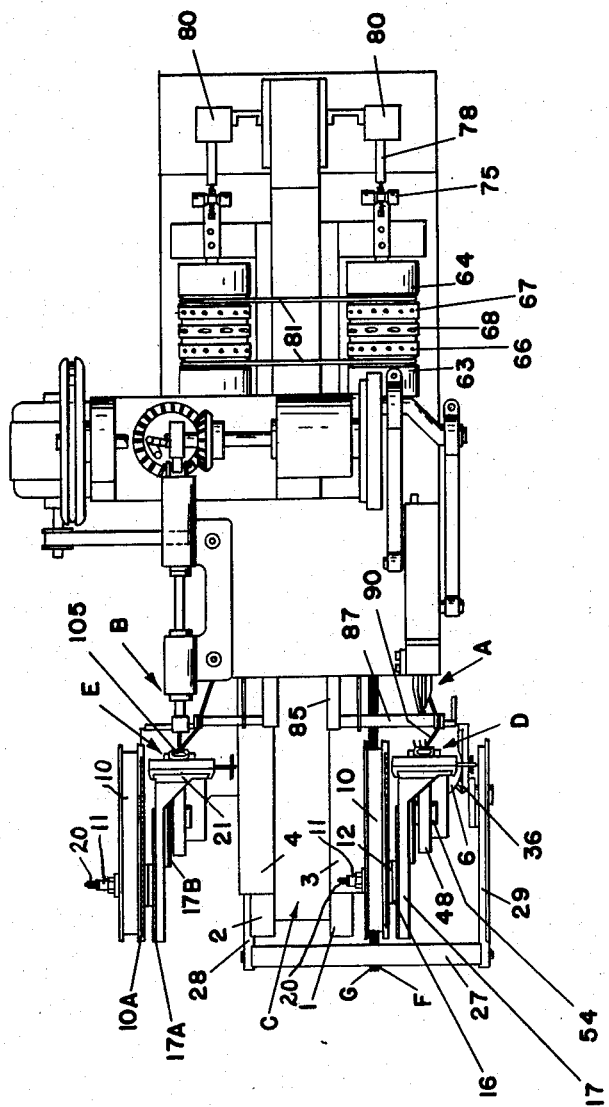

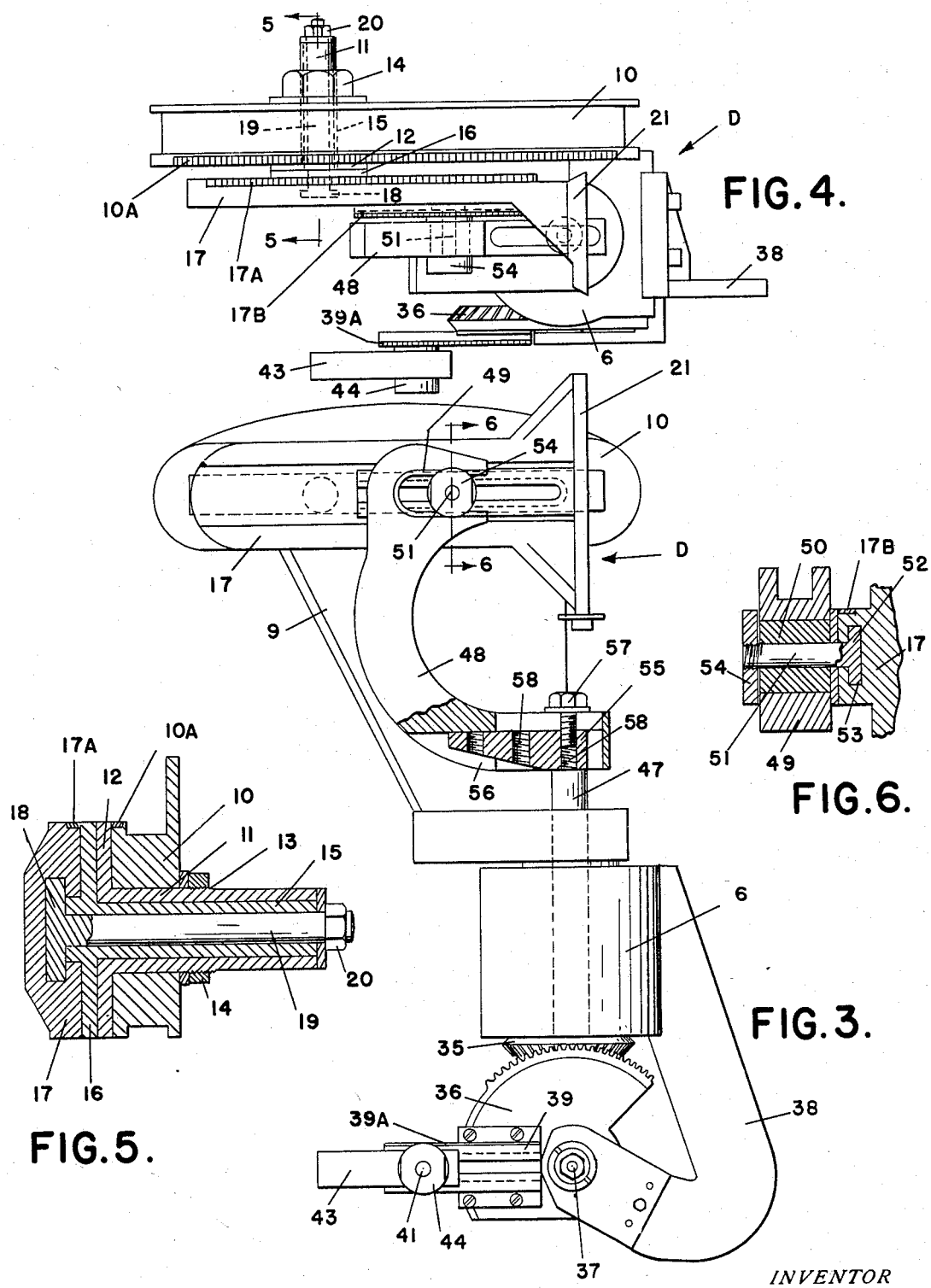

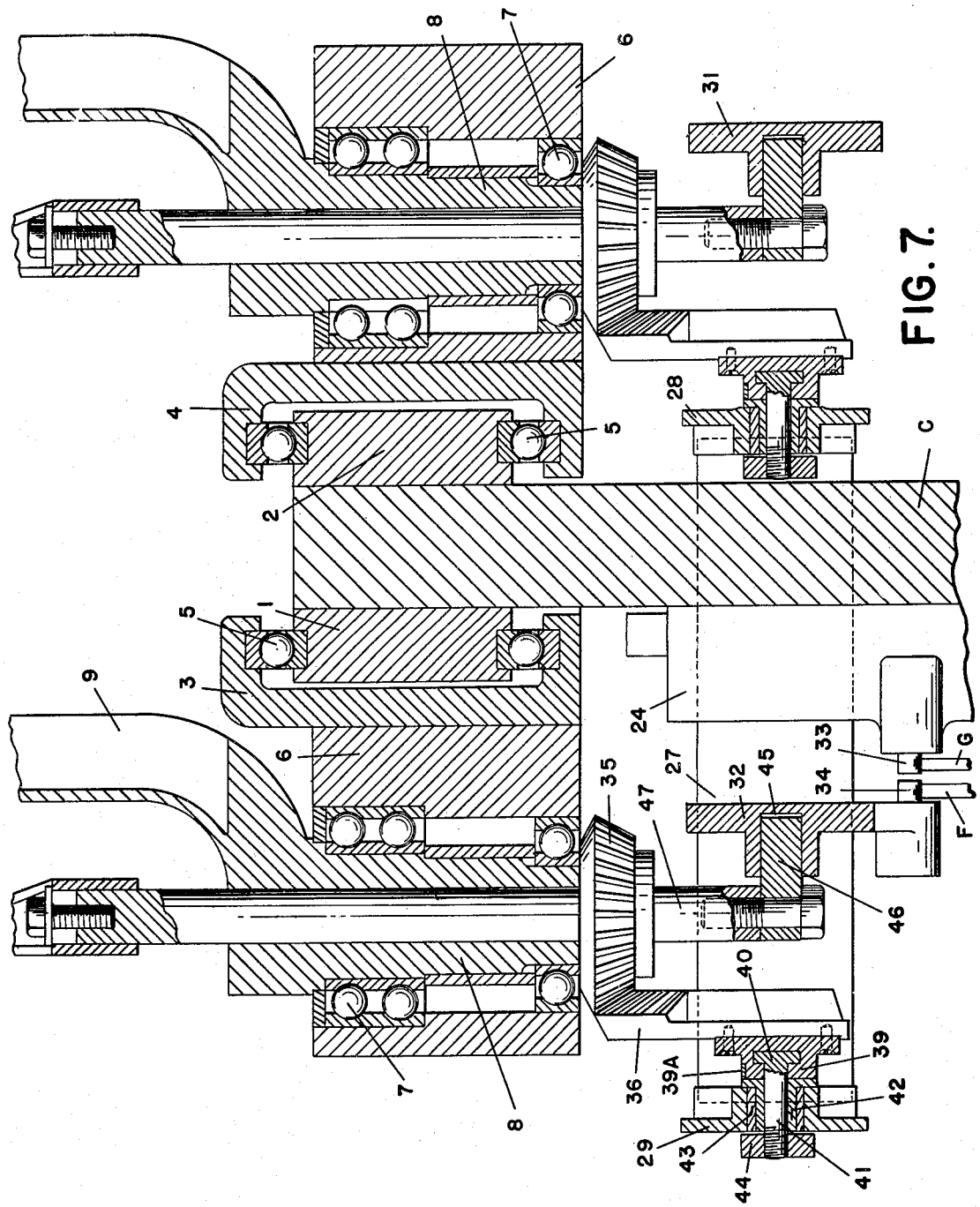

Oct. 17, 1939.   C. JOBST   2,176,672

BRUSH MAKING MACHINE

Filed Dec. 21, 1936   7 Sheets-Sheet 5

INVENTOR
CONRAD JOBST
BY Whittemore Hulbert Belknap
ATTORNEYS

Oct. 17, 1939.          C. JOBST          2,176,672
BRUSH MAKING MACHINE
Filed Dec. 21, 1936          7 Sheets-Sheet 6
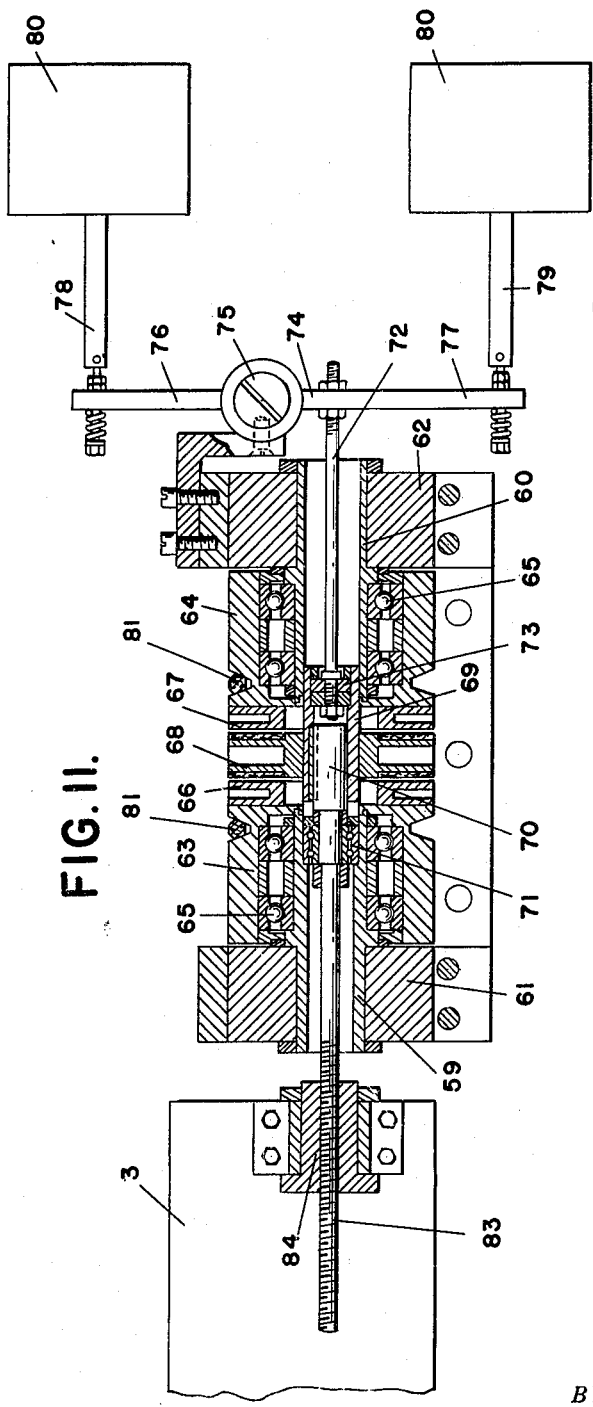
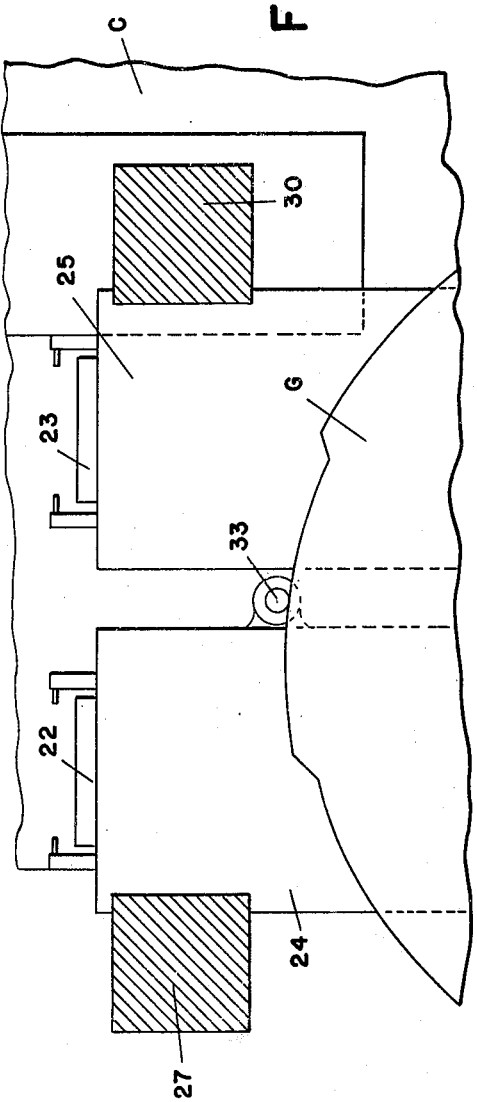
INVENTOR
CONRAD JOBST
BY Whittemore Hulbert & Belknap
ATTORNEYS Oct. 17, 1939.   C. JOBST   2,176,672
BRUSH MAKING MACHINE
Filed Dec. 21, 1936   7 Sheets-Sheet 7
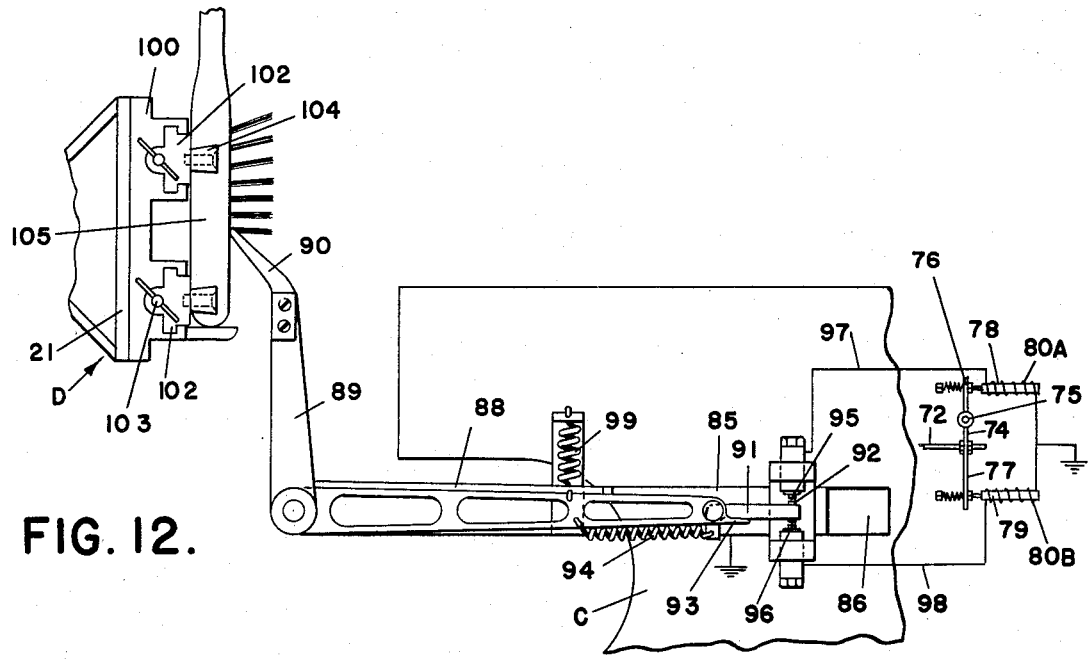
FIG. 12.
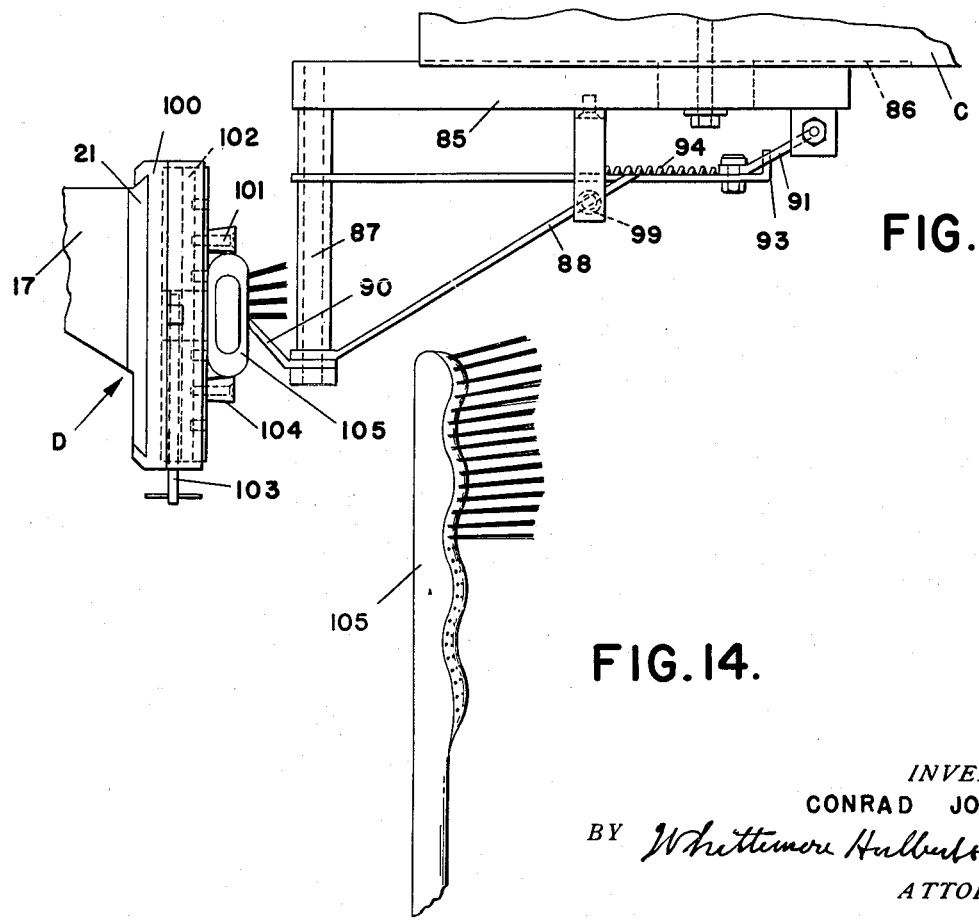
FIG. 13.
FIG. 14.
INVENTOR
CONRAD JOBST
BY Whittemore Hulbert & Belknap
ATTORNEYS Patented Oct. 17, 1939

2,176,672

UNITED STATES PATENT OFFICE 2,176,672

BRUSH MAKING MACHINE

Conrad Jobst, Toledo, Ohio, assignor to The Toledo Automatic Brush Machine Company, Toledo, Ohio, a corporation of Ohio Application December 21, 1936, Serial No. 117,063

20 Claims. (Cl. 300—3)

The invention relates to brush making machines of the general type in which a pair of work holders, one containing an unbored brush back and the other a bored back, are simultaneously presented to synchronously operating boring and tuft setting mechanisms. More particularly, the invention relates to that type of machine in which the tufts are set at divergent angles in relation to each other, this being accomplished by the angular adjustment of the work holder intermediate successive operations of drilling or tufting. With such machines as heretofore constructed the work holders have had only a limited degree of adjustment so that a large number of different holders are required for use in connection with different types of brushes. It is the primary object of the present invention to obtain a construction of universal machine which is capable of adjustment to suit any brush with any desired variation in the angularity of the tufts or the positioning of the same on the brush back and also to provide for drilling and setting tufts in brush backs having any variation in surface contour. With this and other objects in view, the invention consists in the construction as hereinafter set forth.

In the drawings:

Figure 2 is a plan view thereof;

Figure 3 is an enlarged side elevation partly in section of one of the holders and mechanism for adjusting the same;

Figure 4 is a plan view thereof;

Figure 5 is a section on line 5—5 of Figure 4;

Figure 6 is a section on line 6—6 of Figure 3;

Figure 7 is a vertical cross section in the plane of the vertical axes of the pair of holders;

Figure 10 is a similar view on line 10—10 of Figure 8;

Figure 11 is a horizontal section through the clutch mechanism;

Figure 12 is a side elevation of the control mechanism;

Figure 13 is a plan view thereof;

Figure 14 is a side elevation showing a modified form of brush back.

Figure 1:
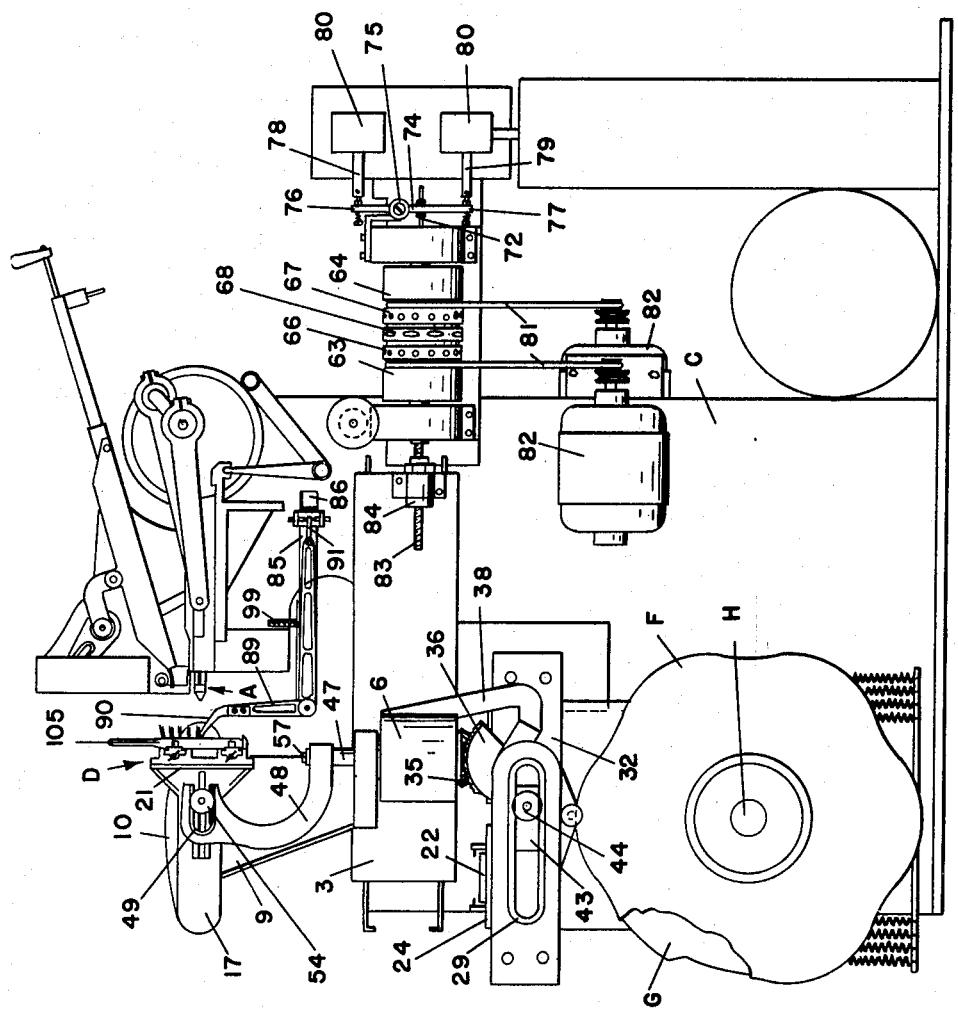
Figure 1 is a side elevation of the machine.
Figure 8:
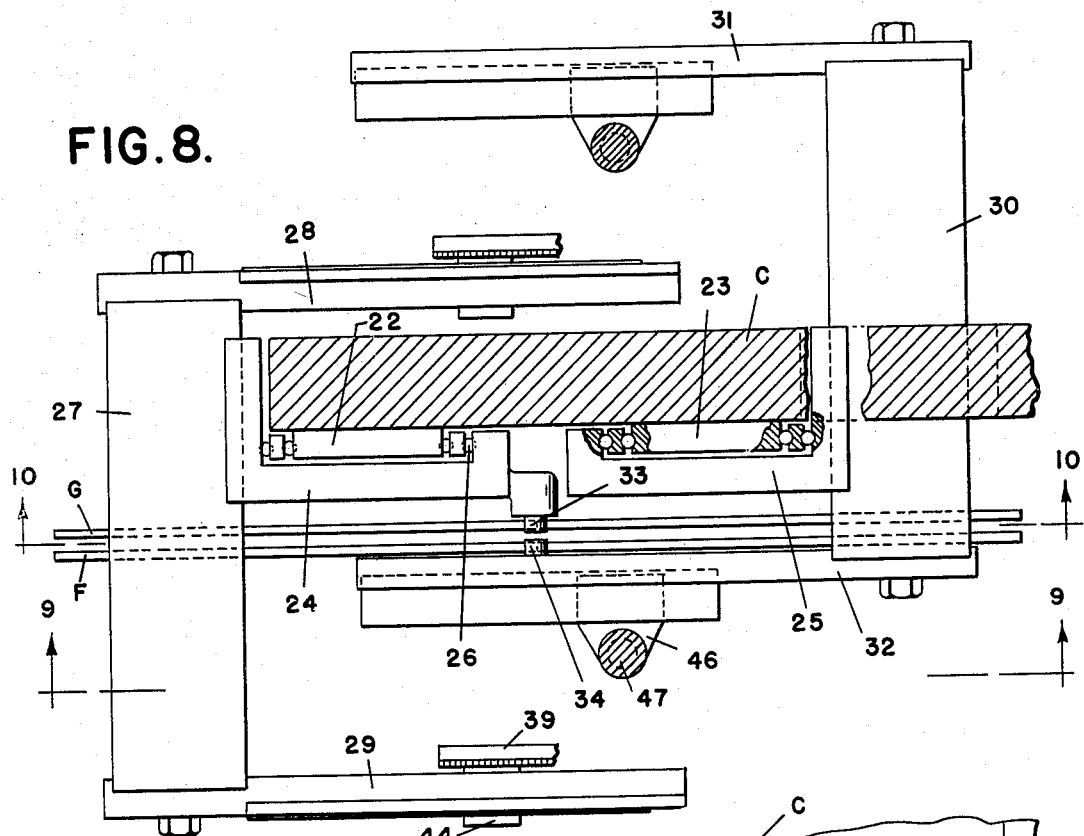
Figure 8 is a horizontal section.
Figure 9:
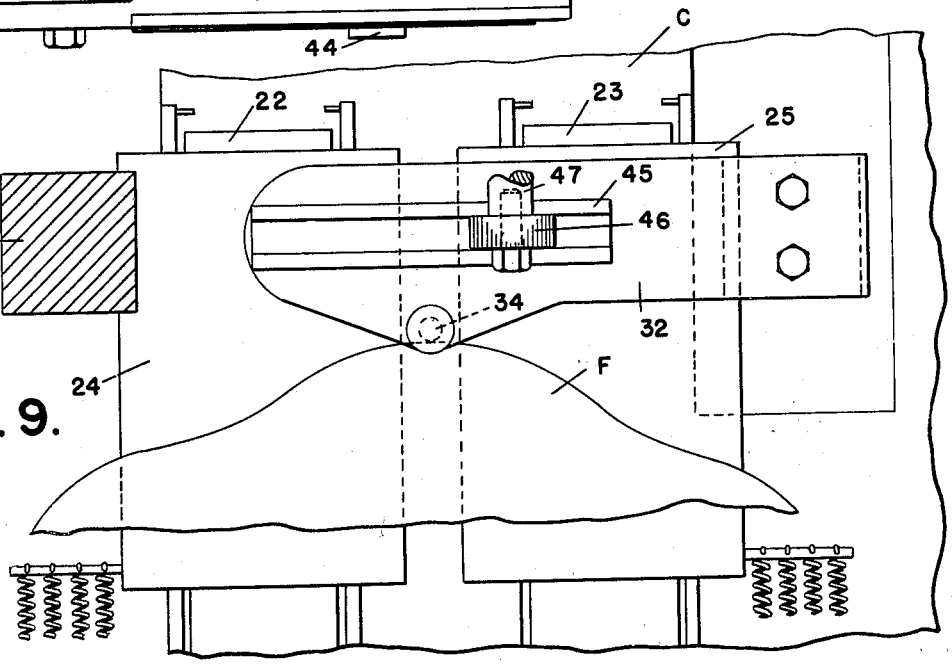
Figure 9 is a vertical section on line 9—9 of Figure 8.

In general construction, my improved machine comprises a tuft setting mechanism A and a drilling mechanism B mounted on a common frame C and synchronously operated by mechanism to simultaneously bore a hole in one brush back and set a tuft in another brush back. As this type of mechanism is shown in my former Patent 1,706,450 of March 26, 1929, and as the specific construction of the same forms no part of the present invention, I shall omit further detailed description thereof. D and E are work holders respectively for a bored brush back to be tufted and a back to be bored. Usually these holders and the operating mechanisms therefor are exact duplicates so that the product of the boring mechanism can be transferred to the other holder to have the tufts set therein. However, there are occasions when it may be desirable to perform the tufting upon backs that have been previously bored or to bore the backs which are not immediately tufted. Furthermore, the backs that are bored at one time may differ from the backs which are being tufted at the same time which requires different adjustments in the two mechanisms. It is, therefore, one of the objects of my invention to obtain a construction in which the two mechanisms may be independently adjusted to correspond to the requirements of the work performed thereby.

Brush backs are of various shapes: in some the surface which is to be tufted lies in a single plane; in others this surface is curved and it may be curved in one plane and straight in a transverse plane or curved in both planes. Furthermore, the radius of curvature varies and may differ in one plane from that in a transverse plane. The essential features of the brush back holder and the operating mechanism therefor are:

First, successive registration of predetermined points in the surface of the back or brush head with the drilling or tufting mechanism;

Second, adjustment at each point of registration of the angle of the brush back or head with respect to the axis of the drill or tufter;

Third, adjustment to bring the surface of the back or head at each point of registration in predetermined relation axially to the drill or tufter, so that the tufts will be set at uniform depth beneath said surface;

Fourth, provision for variation in each of the above adjustments independently of the others.

These various operations and adjustments are accomplished by a construction having the following essential elements:

First, the brush holder is mounted on a traveling carriage movable in a direction parallel to the movement of the tuft setting nozzle or the drill. The movement of this carriage is controlled by a pilot having a contacting finger for engaging the brush back adjacent to the point at which the hole is to be drilled or the tuft set. This pilot is mounted on the stationary frame so that any change in angularity of the brush back which causes a pressure against said finger will bring about a movement of the carriage in a direction away from the finger, while on the other hand any withdrawal of the brush back from the finger will bring about a movement of the carriage towards the finger. This will insure that the surface of the back which is to be drilled or tufted is properly positioned in relation to the drilling or tufting mechanism.

Second, the brush back holder is movable in a horizontal plane about a vertical pivot axis on the carriage and is adjustable in relation to said axis to change the radial length between the same and the surface to be drilled or tufted. This movement is step by step and is controlled by a cam and intermediate mechanism.

Third, the brush holder is also movable in a vertical plane about the axis of a horizontal pivot and this pivot is adjustable in a horizontal plane to change the radial length between its axis and the surface to be drilled or tufted. This movement is also step by step and controlled by a cam.

In detail, the frame C has mounted thereon below the drilling and tufting mechanisms horizontal guideways 1 and 2 for respectively supporting carriages 3 and 4, these preferably having a ball bearing engagement with the guideways as indicated at 5. Each of these carriages has a laterally projecting arm 6 for supporting a bearing 7 in which is revolubly mounted about a vertical axis the shank 8 of an upwardly projecting head or frame 9. As shown in Figure 7, this head 9 is offset from the axis of the shank 8 and has at its upper end a horizontally extending slotted guideway 10. 11 is a bearing block adjustably engaging the slotted guideway 10 having a flange 12 at the front of said guideway and a threaded shank 13 on the opposite side thereof with a clamping nut 14 for holding the block in different positions of adjustment. Journaled in the block 11 is a hollow shaft 15 having a flange 16 adjacent to the flange 12. 17 is an arm adjustably engaging the flange 16 and clamped thereto by the head 18 having a shank 19 passing through the hollow shaft 15 and having a threaded end engaged by a clamping nut 20. The head 18 engages a longitudinally extending slot in the arm 17, and the arrangement is such that when clamped in any position said arm 17 will be free to swing with the shaft 15 around the axis thereof. The outer end of the arm 17 has a head 21 to which the brush back holder D or E is secured. Thus this holder is movable with the head 9 about the vertical axis of the shaft 8 and is also movable about the horizontal axis of the shaft 15. The radial length of the arm 17 between the horizontal axis of the shaft 15 and the face of the brush back which is to be drilled or tufted may be adjusted by loosening the clamping nut 20 and sliding the arm 17 on the head 18. On the other hand, the radial length between the vertical axis of the shank 8 and the face of the brush back which is to be drilled or tufted can be adjusted by loosening the clamping nut 14 and adjusting the bearing block 11 in the slotted guideway 10. Thus the change in angularity in a vertical plane between successive tufts may be effected by one of these adjustments and the change in angularity in a horizontal plane may be effected by the other adjustment. The fact that these adjustments will alter the position of the brush back with respect to the supporting frame 9 is immaterial, inasmuch as this frame is upon the carriage 3 or 4 which is independently adjustable in relation to the drilling or tufting mechanisms.

The swinging movements of the brush back holder about the vertical and horizontal axes are controlled by cams F and G. These are mounted upon a rotatable shaft H journaled in the stationary frame C and operated in timed relation to the operation of the drilling and tufting mechanisms. As this operating and timing mechanism is similar to the construction shown in my former patent above referred to, it is not necessary to illustrate or describe the same. However, in the former construction the brush back holders were mounted upon the stationary frame whereas in the present construction they are supported upon movable carriages. It is, therefore, necessary to provide means for transmitting the controlling movements of the cams to the mechanism on the carriage without being affected by movements of the carriage, this construction being as follows:

Upon a portion of the stationary frame C are vertical guideways 22 and 23 for carriages 24 and 25 which are engaged therewith by ball bearings 26. The carriage 24 supports a frame including the members 27, 28 and 29, while the carriage 25 supports a frame including the members 30, 31 and 32. The carriage 24 also has a projecting finger 33 which engages the cam G so that the curvature in the contour of the latter will effect the raising and lowering of this carriage together with the frame which it supports. In the same manner the cam F engages a projecting finger 34 on the arm 32 so that variations in the contour of this cam will cause a vertical movement of the carriage 25 and members mounted thereon. The arms 28, 29, 31 and 32 extend horizontally and each is provided with a slotted guideway extending longitudinally thereof. These guideways are engaged by slidable bearings through which the vertical movements are transmitted to the mechanisms supported on the carriages 3 and 4 without being affected by the horizontal movements of said carriages. These mechanisms are constructed as follows:

The shank 8 has connected thereto below the bearing 7 a beveled gear wheel 35 which is in mesh with the segmental beveled rack 36. This is pivotally mounted at 37 on an arm 38 depending from the arm 6. The segmental rack 36 has secured thereto an arm 39 having a T-slot extending longitudinally thereof and engaged by the T-head 40 of a pivot pin 41. This pivot pin has a sleeve 42 surrounding the same and together therewith extends through a bearing block 43 which engages the slotted guideway in the arm 29. A clamping nut 44 engaging the threaded end of the pin 41 and bearing against the end of the sleeve 42 serves to clamp the T-head 40 to the arm 39 in different positions of adjustment. The arrangement is such that by adjusting the pivot pin 41 the radial length between the same and the axis of the segmental rack 36 may be varied. Also, in whatever position of adjustment the pin may be, the bearing block 43 will be moved vertically with the carriage 24, while it is free to slide in the slotted guide of the arm 29. Thus the oscillating movement of the arm 39 will not be affected by the horizontal movement of the carriage 3 and this is true with any adjustment as to radial length of said arm.

The vertical oscillation of the brush head about the horizontal pivot shaft 15 is accomplished by the rise and fall of the carriage 25 actuated by the cam F. This cam directly engages the pin 34 on the arm 32 which together with the arm 31 and member 30 is mounted upon the carriage 25. The arm 32 has a longitudinally extending slotted guide 45 which engages a bearing block 46 secured to the lower end of a vertically extending rod 47. This rod passes upward axially through the shank 8 and has at its upper end a yoke arm 48 provided with a horizontal slotted guideway 49 at its upper end. 50 is a bearing block slidably engaging the guideway 49 and connected by a pivot pin 51 with the arm 17. The pin is adjustable on said arm by being provided with a T-head 52 engaging an undercut slot 53 extending longitudinally of said arm and a clamping nut 54 engaging a threaded outer end of the pin 51 and bearing against the block 50 serves as a means for holding the pin in different positions of adjustment. This in turn changes the radial length between the axis of the pivot shaft 15 and the pin 51 thereby increasing or decreasing the length of oscillation which will be imparted to the arm 17. In case a radial length is desired which is in excess of that permitted by the slotted guide 49, the yoke 48 may be adjusted with respect to the rod 47. This is accomplished by providing a head 55 at the upper end of the rod 47 which engages a slot 56 in the lower portion of the yoke and is clamped thereto by a screw 57 engaging any one of a series of threaded apertures 58 in said head 55. Thus any vertical movement of the carriage 25 imparted thereto from the cam F will cause a corresponding movement of the rod 47 which through the yoke 48 and pivot pin 51 will oscillate the arm 17 about the axis of the shaft 15. During this movement the blocks 46 and 50 are free to slide respectively in the guides 45 and 49 so that any movement of the carriage 3 which changes its relation to the cam F will not affect the movement controlled by said cam.

The mechanism above described controls the oscillation of the brush back holder D which is in relation to the tuft setting mechanism but it will be understood that the mechanism for operating the holder E is a duplicate thereof. Thus the arm 28 mounted on the carriage 24 and the arm 31 mounted on the carriage 25 are used for operating the duplicate mechanisms.

It has been stated generally that the horizontal carriages 3 and 4 are controlled in their movements by a pilot mechanism including a finger which contacts with the surface of the brush back which is to be drilled or tufted. The detailed construction of this mechanism is as follows:

Arranged in axial alignment with each other and in substantial alignment with the carriage 3 are the hollow shafts 59 and 60 which are supported in bearing blocks 61 and 62 mounted on the stationary frame. Revolubly mounted on these shafts are the pulleys 63 and 64 which as shown are supported by ball bearings 65. 66 and 67 are clutch faces secured to the adjacent sides of the pulleys 63 and 64 and spaced for the reception of a shiftable clutch member 68 therebetween. This clutch member is mounted on a hollow shaft 69 which telescopically engages the hollow shaft 60 and also has a spline or key engagement with the inner shaft 70 which is journaled in the hollow shaft 61 by a bearing 71 adapted to take care of both radial and end thrusts. A rod 72 extends through the hollow shaft 69 and has a swivel engagement 73 with the shaft 69. This rod 72 is connected to a rockable lever 74 fulcrumed at 75 and having the oppositely extending arms 76 and 77 resiliently connected at their outer ends to rods 78 and 79. These rods extend into housings 80 containing an electromagnetic actuating mechanism by means of which a pull is exerted upon the rod. This movement will in turn actuate the lever 74, and through the rod 72 the hollow shaft 69 and shiftable clutch element 68 mounted thereon will move the latter into frictional engagement with one or the other of the clutch faces 66 and 67. The pulleys 63 and 64 are constantly rotated in reverse direction by suitable means such as the belts 81 driven from electric motors 82 and thus rotation will be imparted to the shaft 69 and the shaft 70 splined thereto in the direction of rotation of the pulley to which it is clutched. The shaft 70 has an extension 83 which is screw threaded and engages a nut 84 mounted on the carriage 3 so that rotation of this screw will impart to the carriage a movement either towards or away from the tuft setting mechanism A. However, the specific construction just described is not essential as any other means for imparting reverse movements to the carriage 3 may be used in place thereof. The pilot for controlling the movement of the mechanism just described is mounted upon the stationary frame and as specifically shown comprises a supporting member 85 adjustable in a guideway 86 on the stationary frame C. The member 85 has a projecting pin 87 on which is pivoted a bell crank lever having the horizontal arm 88 and the substantially vertically extending arm 89. The latter terminates in a finger 90 which is adapted to bear on the surface of the brush back in the holder at a point adjacent to the path of the nozzle of the tuft setting mechanism. At the outer end of the horizontal arm 88 is pivotally secured a bell crank lever 91 which carries at its outer end an electrical contact 92. Movement of this lever 91 in one direction is limited by a stop 93 against which it is yieldably held by a spring 94. The contact 92 is the grounded terminal of a pair of electric circuits having respectively the contact members 95 and 96. These are connected through electric circuits 97 and 98 diagrammatically shown in Figure 12 with the electromagnetic actuating devices 80ᵃ and 80ᵇ controlling the clutch member 68. The arrangement is such that whenever the contact 92 engages the contact 95 the electromagnetic device 80ᵃ will be energized to couple the pulley 63 with the screw 83 to move the carriage 3 in one direction and when the contact 92 is engaged with the contact 96 the electromagnetic device 80ᵇ will be energized to couple the pulley 64 with the screw 83 to move the carriage 3 in the reverse direction. The finger 90 is yieldably pressed against the brush back by a spring 99 attached to the arm 88 so that any movement of the brush back away from the finger will cause the contact 92 to engage the contact 95, while any movement of the brush back towards the finger will cause the contact 92 to engage the contact 96. Each of these by energizing its respective electromagnetic device will through the mechanism described effect a reverse movement of the brush back holder to again restore the pilot to neutral position where the face of the back will be in proper relation to the tufting mechanism. A similar pilot mechanism cooperates with the holder for the brush backs to be drilled and controls the movement of the carriage 4 on which said holder is mounted.

The clamping holders for the brush backs may be of any suitable construction, but as shown in Figures 12 and 13, 100 is one member of the clamp mounted on the head 21 of the arm 17. 101 are clamping lugs adjustably engaging sockets in the member 100. 102 are transverse slides engaging the member 100 and actuated by clamping screws 103, said slides 102 having lugs 104 for engaging the opposite edge of the brush back. Thus a brush back such as 105 may be clamped in position between the lugs 101 and 104 and thereby firmly held in relation to the head 21.

Setting of machine

As has been previously stated, the machine is, within limits, universally adjustable so as to be adapted for operation on any kind of brush. These adjustments include: first, the positioning of the tufts in relation to each other on the brush back; and second, the angle of each tuft which is determined by angular adjustment of the brush back in both vertical and horizontal planes. It will also be understood that variation in angular adjustment is accomplished by change in the radial length between the pivot and brush back and that such adjustment in a vertical plane will necessitate a corresponding adjustment in the horizontal plane, also, that while the step by step movement is controlled by the cams, this angular adjustment will alter the spacing of the steps. I have, therefore, provided means for avoiding confusion in the setting of the machine which includes a series of scales for the separate adjustments. These may be used in connection with printed directions so that the operator will understand that by setting each adjustment to a particular position on its scale, the proper setting for a predetermined brush will be effected.

As shown in Figure 4, the member 10 has mounted thereon a scale 10ª for indicating the adjusted position of the block 11 for the pivot 15. There is also a scale 17ª on the member 17 for indicating the adjusted position thereof with respect to the head 18 and the pivot 15. A third scale 17ᵇ is placed on the member 17 for indicating the adjustment of the bearing block 50 and pivot pin 51 in relation thereto, and a fourth scale 39ª is placed on the member 39 to indicate the adjusted position of the head 40 and pivot pin 41. Thus to set the head for a particular brush back, adjustment is first made of the member 17 with respect to the pivot 15 to determine the distance between the axis of this pivot and the working face of the brush back. The bearing block 11 is next adjusted along the scale 10ª to determine the radial distance between the working face of the brush back and the axis of the shank 8. The bearing block 50 is then adjusted with respect to the scale 17ᵇ to position the pin 51 with respect to the pivot 15 and thereby to determine the amount of lift for each step in the cam. Finally, the head 40 is adjusted with respect to the scale 39ª to change the radial length between the pivot 41 and the axis 37 and to thereby determine the lateral angular movement of the head for each step of the cam.

The cams F and G are suitably fashioned to control the movements of the mechanism just described but the same cams may be used for operating with different adjustments of the setting means. Thus by changing the radial lengths for the vertical and horizontal movements a larger or smaller brush may be operated upon using the same cams.

Operation

In operation the cams F and G will control the angular movements of the holder and brush back starting in one position and completing the cycle at a point adjacent to the starting position ready for the starting of another cycle. At each successive point of registration the pilot contacting with the face of the brush back will move the carriage 3 or 4 so as to position this face at an exact point in relation to the stationary frame thereby securing uniform depth of holes drilled and of tufts set in said holes. This movement of the carriage is accomplished by the mechanism and in the manner previously described.

One advantage of my improved machine is that it can be used in setting tufts on brush backs having any kind of regular or irregular surface contour. For instance, as shown in Figure 14, the brush back 105 is formed with a wavy face so as to produce a corresponding wavy contour by the ends of the tufts. With machines of the type heretofore used it would be impossible to set the tufts on such a back without modification of the cams and other parts of the mechanism. However, with my machine the pilot traversing this wavy contour will adjust the carriage into proper position for each tuft.

What I claim as my invention is:

1. The combination with a frame, of a tool mounted on said frame and having a fixed axis thereon, a holder for work to be operated upon by said tool, means for adjusting said holder to register with said axis different points in the surface of the work to be operated upon by said tool, and means located in operative relation to said frame responsive to the contour of said surface for bodily adjusting said holder on said frame to bring each point of registration into a fixed position in relation thereto whereby the relation of the tool and work is unaffected by variations in contour of the work.

2. The combination with a frame, of a tool mounted on said frame and having a fixed axis thereon, a holder for work to be operated upon by said tool, means for angularly adjusting said holder to register with said axis different points in the surface of the work to be operated upon by said tool, and means located in operative relation to said frame responsive to the contour of said surface for bodily adjusting said holder on said frame to bring each point of registration into a fixed position in relation thereto whereby the relation of the tool and work is unaffected by variations in contour or angular adjustment of the work.

3. The combination with a frame, of a tool mounted on said frame and having a fixed axis thereon, a holder for work to be operated upon by said tool, means for adjusting said holder in transverse planes to register with said axis different points in the surface of the work to be operated upon by said tool, and means located in operative relation to said frame responsive to the contour of said surface for bodily adjusting said holder on said frame to bring each point of registration into a fixed position in relation thereto whereby the relation of the tool and work is unaffected by variations in contour of the work.

4. The combination with a frame, of a tool mounted on said frame and having a fixed axis thereon, a holder for work to be operated upon by said tool, means for angularly adjusting said holder in transverse planes to successively register with said axis different points in the surface of the work to be operated upon by said tool, the adjustment in each plane being independent of the adjustment in the other plane, and means independent of said angular adjustments and located in operative relation to said frame responsive to the contour of said surface for bodily adjusting said holder on said frame to bring each point of registration in said surface into a coincidence with a fixed position in said axis whereby the relation of said tool and work is unaffected by variations in contour or angular adjustment of the work.

5. The combination with a frame, of a tool mounted on said frame having a fixed axis thereon, a holder for work to be operated upon by said tool, means for angularly adjusting said holder in transverse planes to successively register with said axis different points in the surface of the work, means for varying the radius of angular adjustment in each plane, and means independent of such variation in angular adjustments and located in operative relation to said frame responsive to the contour of the surface of the work for bodily adjusting said holder on said frame to bring each point of registration in fixed position in relation thereto.

6. The combination with a frame, of a tool mounted on said frame and having a fixed axis thereon, a holder for work to be operated upon by said tool, a carriage on which said holder is mounted movable on said frame towards or from said tool, means for angularly adjusting said holder to register with said axis different points in the surface of the work to be operated upon by said tool, and means located in operative relation to said frame responsive to the contour of said surface for moving said carriage to bring each point of registration in the surface of the work into a fixed position in relation to said frame.

7. The combination with a frame, of a tool mounted on said frame and having a fixed axis thereon, a holder for work to be operated upon by said tool, a carriage on which said holder is mounted movable on said frame towards or from said tool, means for angularly adjusting said holder to register with said axis different points in the surface of the work to be operated upon by said tool, a pilot for contacting the surface of the work adjacent to the point operated upon by said tool, and means controlled by said pilot when displaced by the surface of the work contacting therewith for moving said carriage to bring the point of contact with said pilot into a fixed position in relation to said frame.

8. The combination with a frame, of a tool mounted on said frame and having a fixed axis thereon, a holder for work to be operated upon by said tool, a carriage on which said holder is mounted movable on said frame towards or from said tool, means for angularly adjusting said holder to register with said axis different points in the surface of the work to be operated upon by said tool, a pilot resiliently yieldably mounted on said frame and adapted to contact the surface of the work adjacent to the point operated upon by said tool, said pilot having a normal position in relation to said frame, and means operated by the displacement of the pilot from said normal position for moving said carriage to restore the pilot to such normal position and thereby position the work in operative relation to said tool, means operated by the displacement of said pilot for moving said carriage to restore said pilot to normal position and to thereby place the work in operative relation to said tool.

9. The combination with a frame, of a tool mounted on said frame, a holder for work to be operated upon by said tool, means for angularly adjusting said holder to register different points in the surface of the work with said tool, and means located in operative relation to said frame responsive to the contour of said surface to bring each point of registration into operative relation to said tool.

10. The combination with a frame, of a tool mounted on said frame, a holder for work to be operated upon by said tool, a carriage on which said holder is mounted movable horizontally on said frame towards or from said tool, a cam mounted on said frame, a vertically movable carriage actuated by said cam, means on said horizontally movable carriage actuated in all positions thereof by said vertically movable carriage for angularly adjusting said holder to register different points in the surface of the work with said tool, a pilot for contacting the surface of the work adjacent to the point operated upon by said tool, said pilot having a normal position in which the surface contacting therewith is in operative relation to the tool, and means controlled by said pilot when displaced from said normal position for moving said carriage until said normal position is restored.

11. The combination with a frame, of a tool mounted on said frame having a fixed axis thereon, a holder for work to be operated upon by said tool, a carriage on which said holder is mounted, a feed screw for moving said carriage horizontally towards or from said tool, reversely rotating members aligned with said screw, a clutch for alternatively coupling said screw with said reversely rotating members, means for angularly adjusting said holder to register with said axis different points in the surface of the work to be operated upon by said tool, a pilot resiliently pressed against the surface of the work and contacting the same adjacent to the point operated upon by said tool being in normal position when said surface is in operative relation to the tool, and means controlled by the displacement of said pilot for operating said clutch whereby said carriage is moved in a direction to restore said normal position of the pilot and to hold the work in operative relation with the tool.

12. The combination with a frame, of a tool mounted on said frame, a holder for work to be operated upon by said tool, means for adjusting said holder to register different points in the surface of the work with said tool, and means controlled by the surface of the work adjacent to the point of contact with said tool for bodily moving said holder to bring said point in the surface in operative redation to the tool.

13. The combination with a frame, of a tool mounted on said frame, a holder for work to be operated upon by said tool, means for adjusting said holder to register different points in the surface of the work with said tool, a pilot for contacting the surface of the work adjacent to the point of registration with the tool, and means controlled by the displacement of said pilot toward or from said tool for bodily moving said holder to bring said point in operative relation to the tool.

14. The combination with a work holder, a tool and a tool support, of mechanism for adjusting said work holder in two dimensions to successively register with said tool different predetermined points in the surface of the work, and independent means responsive to all variations in the contour of said surface for relatively adjusting said work holder and tool support in a third dimension to bring each registered point in said surface into the same relation to said tool support.

15. The combination with a plurality of tools, a tool support therefor and a plurality of work holders for respectively cooperating with said tools, of mechanism for simultaneously adjusting said work holders correspondingly in two dimensions to successively register predetermined points in the surface of the work with the respective tools, and means responsive to variations in the contour of said surface for independently relatively adjusting each work holder with respect to the tool support in a third dimension to bring each registered point in said surface into the same relation to said tool support.

16. The combination with a frame, a plurality of tools mounted thereon and a plurality of work holders for respectively cooperating with said tools, a carriage for each work holder movable horizontally on said frame toward or from the corresponding tool, means controlling the movement of each carriage independent of that of the others, mechanism on each carriage for adjusting the work holder thereon in two dimensions to successively register with the tool predetermined points in the surface of the work, and a common means on said frame for simultaneously operating the mechanisms on said carriages in every position of adjustment of the latter on said frame.

17. The combination with a frame, a plurality of tools mounted thereon and a plurality of work holders for respectively cooperating with said tools, a carriage for each work holder movable horizontally on said frame toward or from the corresponding tool, means controlling the movement of each carriage independent of that of the others, mechanism on each carriage for adjusting the work holder thereon in two dimensions to successively register with the tool predetermined points in the surface of the work, a pair of cams on said frame, a pair of carriages vertically movable on said frame and controlled respectively by said cams, and means on each vertically movable carriage for controlling the mechanisms on each horizontally movable carriage in every position of relative advancement thereof, one of said cams controlling the movement in one of said two dimensions and the other the movement in the other of said two dimensions.

18. The combination with a work holder, a tool and a tool support, of means for relatively adjusting said work holder and tool support in two dimensions to successively register with said tool predetermined points in the surface of the work, and means universally operable on work of all surface contours for independently relatively adjusting said work holder and tool support in a third dimension to bring each point in said surface of the work when registered with said tool into the same relation to said tool support.

19. The combination with a work holder, a tool and a tool support, of means for relatively adjusting said work holder and tool support in two dimensions to successively register with said tool predetermined points in the surface of the work, a pilot mounted on said work support for contacting with the surface of the work adjacent to the point operated on by said tool, and means controlled by said pilot when displaced from said surface of the work for independently relatively adjusting said work holder and tool support in a third dimension to bring each point in said surface of the work when registered with said tool into the same relation to said tool support.

20. The combination with a work holder, a tool and a tool support, of means for relatively adjusting said work holder and tool support in two dimensions to successively register with said tool predetermined points in the surface of the work, a carriage for relatively moving said work holder and tool support in a third dimension, a pilot mounted on said tool support for contacting the surface of said work adjacent to the point operated on by said tool, and means controlled by said pilot when displaced from said surface for operating said carriage to bring each point in said surface of the work when registered with said tool into the same relation to said tool support.

CONRAD JOBST.